(12) United States Patent
Sterbling et al.

(10) Patent No.: US 12,143,507 B2
(45) Date of Patent: Nov. 12, 2024

(54) SECURE TENANT-BASED CHAOS EXPERIMENTS USING CERTIFICATES

(71) Applicant: SAP SE, Walldorf (DE)

(72) Inventors: Sven Sterbling, Boblingen (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 17/894,606

(22) Filed: Aug. 24, 2022

(65) Prior Publication Data

US 2024/0073032 A1 Feb. 29, 2024

(51) Int. Cl.
*H04L 9/32* (2006.01)
*H04L 9/30* (2006.01)

(52) U.S. Cl.
CPC .............. *H04L 9/3265* (2013.01); *H04L 9/30* (2013.01)

(58) Field of Classification Search
CPC ..... H04L 9/3265; H04L 9/30; H04L 63/0442; H04L 63/0823; G06F 21/57; G06F 2221/034
See application file for complete search history.

(56) References Cited

U.S. PATENT DOCUMENTS

| 2021/0263836 A1* | 8/2021 | Singh | G06F 11/3664 |
| 2022/0224625 A1* | 7/2022 | Anderson | G06F 11/3006 |
| 2022/0308972 A1* | 9/2022 | Anand | G06Q 10/063112 |

FOREIGN PATENT DOCUMENTS

CN 110413398 A * 11/2019 ........... G06F 9/4806

* cited by examiner

*Primary Examiner* — Trong H Nguyen
(74) *Attorney, Agent, or Firm* — SCHWEGMAN LUNDBERG & WOESSNER, P.A.

(57) ABSTRACT

Techniques for implementing secure tenant-based chaos experiments using certificates are disclosed. In some embodiments, a computer system may receive an indication of a scope of execution for a chaos experiment from a tenant of a multitenancy environment, identify a public key from a certificate chain based on the received indication of the scope of execution, and transmit the identified public key to the tenant. Next, the computer system may then receive an encrypted version of the chaos experiment from the tenant, where the encrypted version of the chaos experiment has been encrypted with the identified public key, and then transmit the encrypted version of the chaos experiment to one or more software agents.

20 Claims, 6 Drawing Sheets

SECURE TENANT-BASED CHAOS EXPERIMENTS USING CERTIFICATES

BACKGROUND

Chaos engineering is the discipline of experimenting on a system in production in order to build confidence in the system's capability to withstand turbulent and unexpected conditions. Chaos engineering can be used to achieve resilience against infrastructure failures, network failures, and application failures.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
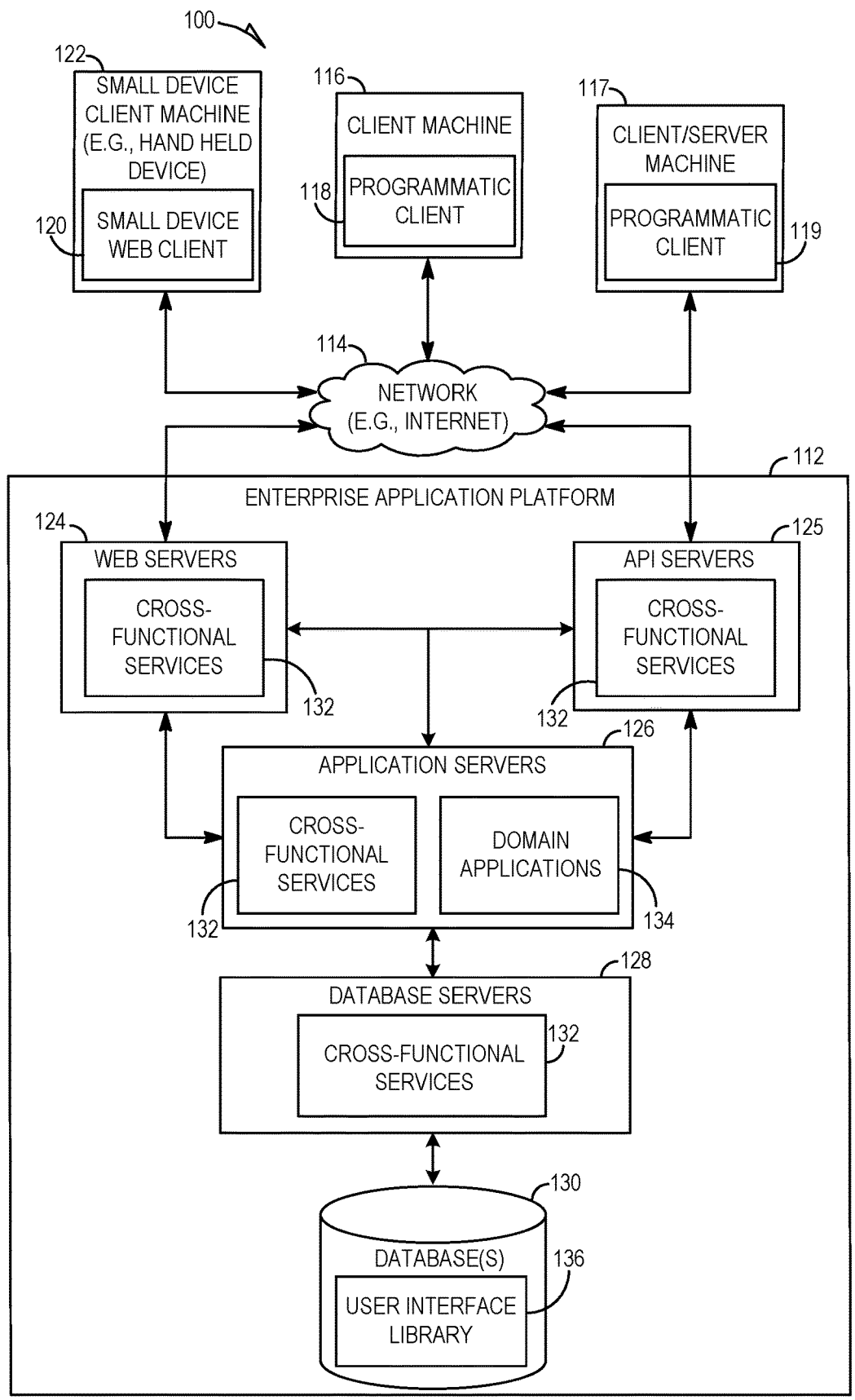
FIG. 1 is an example network diagram illustrating a system.

Example methods and systems for efficiently implementing secure tenant-based chaos experiments using certificates are disclosed. In the following description, for purposes of explanation, numerous specific details are set forth in order to provide a thorough understanding of example embodiments. It will be evident, however, to one skilled in the art that the present embodiments can be practiced without these specific details.

Cloud providers, such as platform-as-a-Service (PaaS) providers, handle and operate a large estate of multitenant applications in all forms and flavors. These applications often comprise a multitude of services that interact with each other as part of a microservice architecture, which is an architectural style that structures an application as a collection of services that are loosely-coupled and independently deployable. Microservice applications are difficult to test because the individual services are only responsible for a very specific purpose and the individual services are typically controlled by different groups. Integration testing is especially challenging, and errors and bottlenecks are often only found in production or deployment environments under actual end user loads. These challenges become even greater in systems where a multitude of services, each consisting of a multitude of microservices, have to be connected, and where data integration plays an increasing role. Such systems cannot be tested with traditional means and new approaches to making them reliable and stable are necessary.

Although chaos engineering has proven helpful in making cloud infrastructure more stable and reliable, its usage in applications is still limited due to several technical challenges that are unique to the application domain. For example, injecting errors into a system has a much more direct impact on end users because the code is closer to the end user. Furthermore, deciding on which experiments to conduct is more difficult because applications differ widely in their purpose and in the underlying technology. Additionally, the decision about which tests to execute is made by a development team, not the owners of a tenant that might be affected by the chaos experiment. Current chaos engineering solutions fail to provide tenants with the ability to control the scope of execution of a chaos experiment that induces a turbulent condition in one or more computing resources of a multitenancy environment.

The implementation of the features disclosed herein involves a non-generic, unconventional, and non-routine operation or combination of operations. By applying one or more of the solutions disclosed herein, some technical effects of the system and method of the present disclosure are to implement secure tenant-based chaos experiments using certificates. In some example embodiments, a computer system may receive, from a tenant of a multitenancy environment, an indication of a scope of execution for a chaos experiment, identify a public key from a certificate chain based on the received indication of the scope of execution, transmit the identified public key to the tenant, and receive an encrypted version of the chaos experiment from the tenant, where the encrypted version of the chaos experiment has been encrypted with the identified public key. The computer system may then transmit the encrypted version of the chaos experiment to one or more software agents, which may decrypt the encrypted version of the chaos experiment using a private key stored in a key store in association with the tenant and execute the chaos experiment within the scope of execution on one or more computing resources of the tenant.

By using a public key from certificate chain to encrypt a chaos experiment, the computer system ensures a secure tenant-specific execution of the chaos experiment in which the tenant is provided flexibility to modify the scope of execution of the chaos experiment from a broad level (e.g., executing the chaos experiment in all applications of a tenant that is running in a specific cloud environment or in a specific infrastructure) to a granular level (e.g., executing the chaos experiment only in a specific module of an application). Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
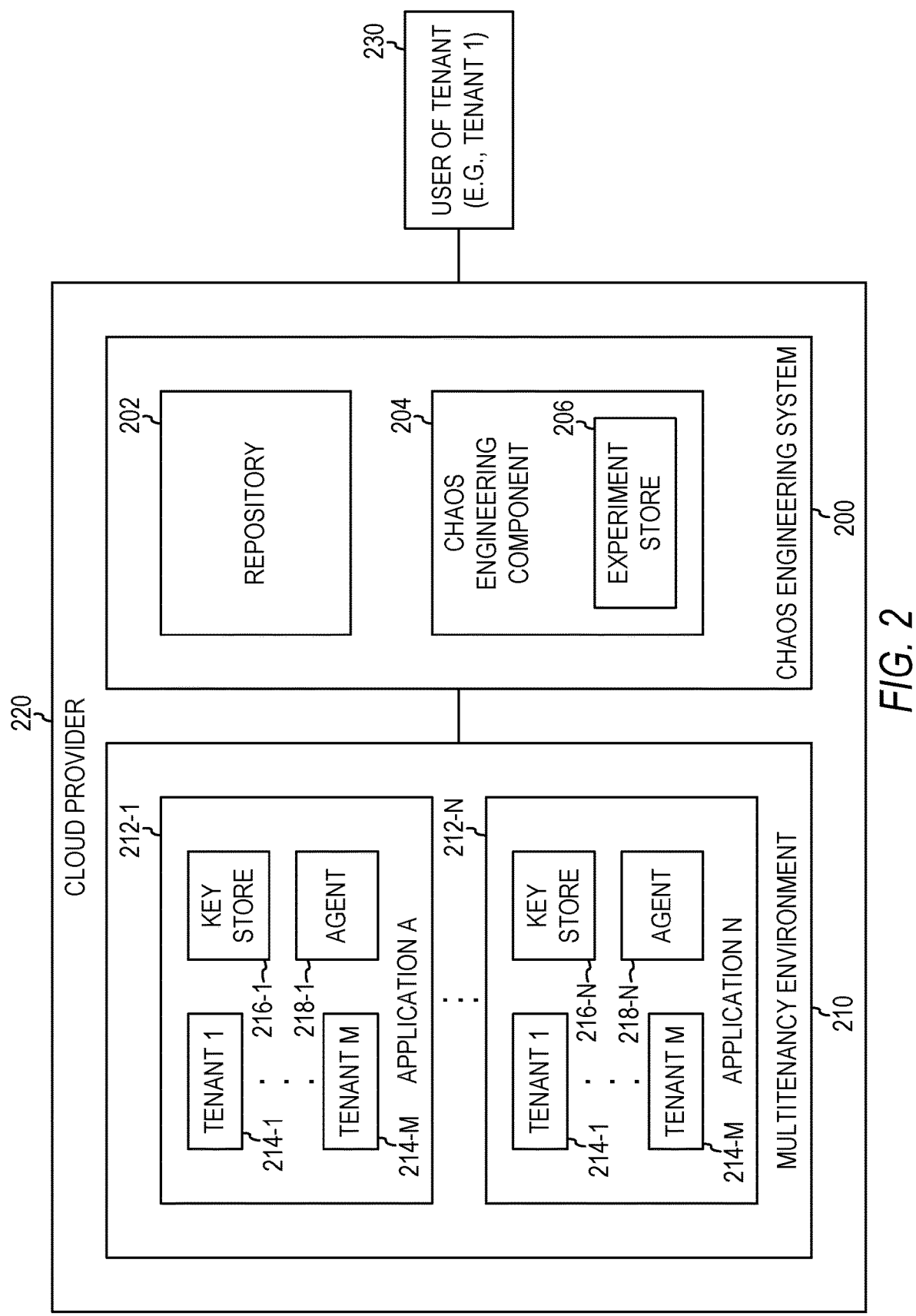
FIG. 2 is a block diagram illustrating an example chaos engineering system.

FIG. 2 is a block diagram illustrating an example chaos engineering system 200. The components shown in FIG. 2 may be configured to communicate with each other via one or more network connections. In FIG. 2, the chaos engineering system 200 is connected to a multitenancy environment 210, such as by a network connection (e.g., network 114 in FIG. 1). The multitenancy environment 210 comprises a software architecture in which a single instance of a software application 212 runs on a server and serves multiple tenants 214. Systems designed with this multitenancy architecture are often referred to as being shared, rather than dedicated or isolated. The tenant 214 is a group of users who share a common access with specific privileges to a software instance, such as to the software application 212. With a multitenancy architecture, such as that of the multitenancy environment 210, the software application 212 is designed to provide every tenant 214 a dedicated share of the instance, including its data.

In the example shown in FIG. 2, multiple software applications 212 (e.g., "APPLICATION A" 212-1 to "APPLICATION N" 212-N) are implemented and running within the multitenancy environment 210, with each software application 212 serving multiple tenants 214 (e.g., "TENANT 1" 214-1 to TENANT M" 214-M). Although FIG. 2 shows the software applications 212 serving the same set of tenants 214, it is contemplated that the set of tenants 214 that are being served by each software application 212 may vary from one software application 212 to another. In some example embodiments, the multitenancy environment 210 may be implemented by a cloud provider 220. The cloud provider 220 may be implemented by the same cloud provider 220 as the multitenancy environment 210 or by a different cloud provider 220 as the multitenancy environment 210. Furthermore, a plurality of different multitenancy environments 210 may be implemented by the same cloud provider 220. The chaos engineering system 200 may communicate with any configuration of one or more multitenancy environments 210 across any configuration of one or more cloud providers 220 via a network connection.

In some example embodiments, the chaos engineering system 200 comprises any combination of one or more of a repository 202 and a chaos engineering component 204. One or more of the components of the chaos engineering system 200 may be implemented by the enterprise application platform 112 of FIG. 1. For example, the repository 202 may be incorporated into the application server(s) 126 and the chaos engineering component 204 may be incorporated into the database server(s) 128. Additionally, the multitenancy environment 210 and the cloud provider 220 may also be implemented by the enterprise application platform 112 of FIG. 1. However, the chaos engineering system 200, the multitenancy environment 210, and the cloud provider 220 may be implemented in other ways as well.

Figure 3:
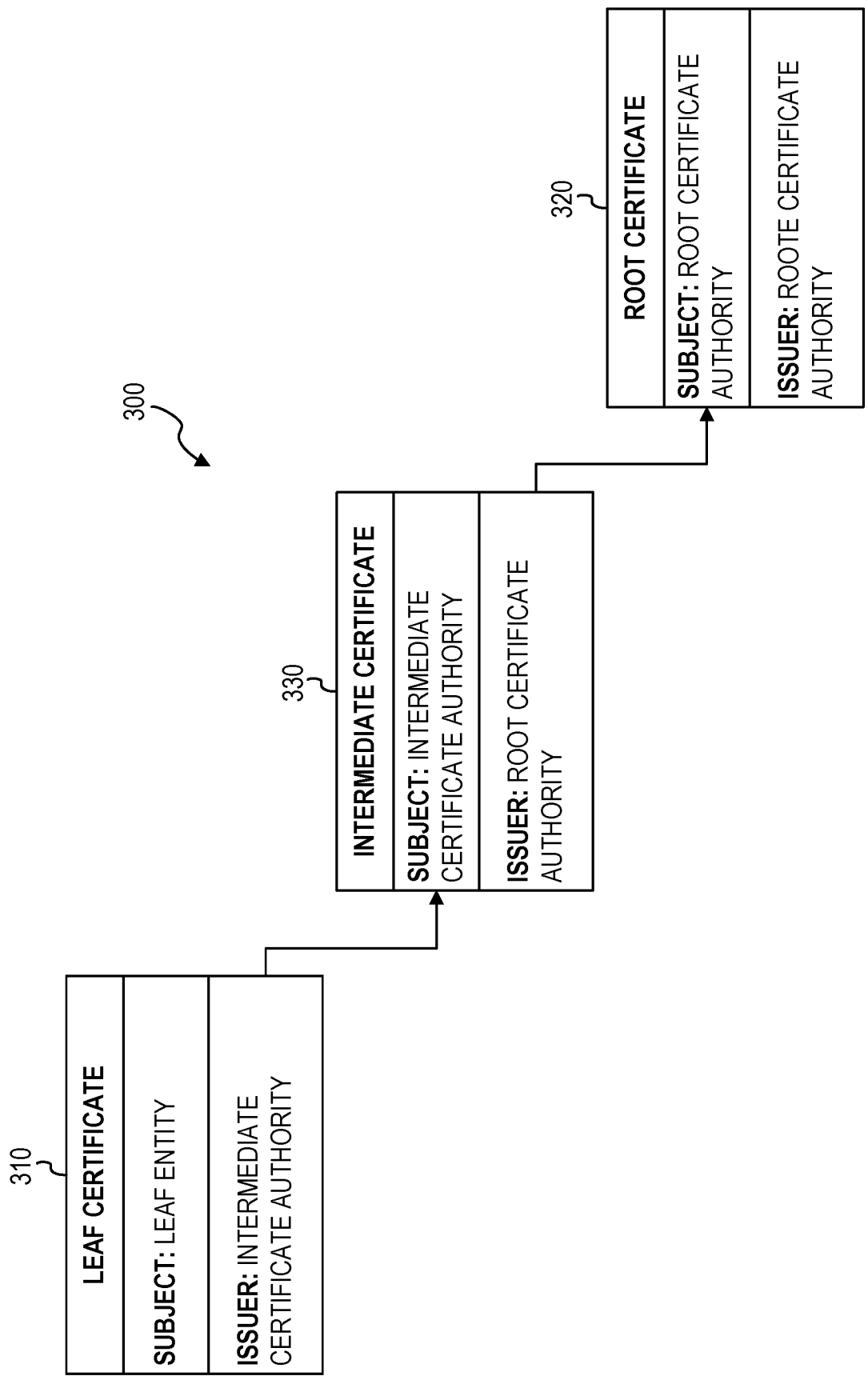
FIG. 3 illustrates an example certificate chain.

The chaos engineering system 200 may be configured to implement tenant-specific execution of chaos experiments, using a certificate-based trust chain to ensure that chaos experiments are executed within the proper scope of execution to avoid execution on computing resources of incorrect tenants or even on incorrect computing resources of the correct tenant. In some example embodiments, the chaos engineering system 200 may be configured to store one or more certificate chains 300 in the repository 202. FIG. 3 illustrates an example certificate chain 300. The certificate chain 300 may comprise a list of certificates used to authenticate an entity. In FIG. 3, the certificate chain 300 comprises a leaf certificate 310, a root certificate 320, and an intermediate certificate 330 in a hierarchical chain of trust in terms of how one certificate signs the next, starting with the root certificate 320 and eventually making its way to the leaf certificate 310.

The root certificate 320, also known as the trusted root, is the certificate issued directly by a root certificate authority. Certificates are issued and signed by certificates that reside higher in the hierarchy of the certificate chain 300, so the validity and trustworthiness of a given certificate is determined by the corresponding validity of the certificate that signed it. Unlike the other certificates in the certificate chain 300, the root certificate 320 is self-signed by the root certificate authority. The private key of the root certificate 320 may be used to sign the other certificates in the hierarchy certificate chain 300. The intermediate certificate 330 may be signed by the private key of the root certificate 320 that issues it. Although FIG. 3 shows only one intermediate certificate 320 between the root certificate 320 and the leaf certificate 310 in the certificate chain 300, there can be more than one intermediate certificate 330 between the root certificate 320 and the leaf certificate 310. In order to verify the leaf certificate 310, a computing resource may start with the leaf certificate 310 and follow it back to the root certificate 320 to establish the trust. If any of the certificates in the certificate chain 300 cannot be verified, then the validation will fail.

Referring back to FIG. 2, in some example embodiments, the repository 202 may serve as a root certificate authority for the multitenancy environment 210. The repository 202 may generate and manage the tenant-specific certificate chains 300 and distribute the keys of the certificate chains 300 to the corresponding software agents 218. The repository 202 may provide an external interface to expose public keys to users that are included as authorized users of authenticated tenants 214, as well as an internal interface to distribute private keys and provide a validity check for the certificates provided by the repository 202. Private keys may be scoped to a tenant 214 and a tenant-specific certificate chain 300 for the applications 212, regions, and other computer resources used by the tenant 214.

Each certificate chain 300 may be stored in the repository in association with a corresponding tenant 214, thereby enabling data to be accessed and retrieved from the appropriate certificate chain when data is requested in association with a particular tenant 214, such as when a request is submitted, via a computing device, by a user 230 that is included as an authorized user of the tenant 214. For example, a first certificate chain 300 for a first tenant 214-1 may be stored in the repository 202 in association with the first tenant 214-1, a second certificate chain 300 for a second tenant 214-2 may be stored in the repository 202 in association with the second tenant 214-2, and so on and so forth.

The chaos engineering system 200 may receive an indication of a scope of execution for a chaos experiment from a tenant 214 of the multitenancy environment 210. For example, a user 230 that is included as an authorized user of the tenant 214 may use a computing device to submit a request to the chaos engineering system 200. The request may comprise a request to create, schedule, or trigger the chaos experiment and include the indication of the scope of execution, or the request may comprise a request for a public key and include the indication of the scope of execution. The indication of the scope of execution may indicate a computing resource of the multitenancy environment 210 within which the chaos experiment is to be executed. The computing resource may comprise a service of a microservice architecture, an application, a module of an application, a cloud environment (e.g., a specific PaaS), or a computing infrastructure (e.g., a specific data center or availability zone). Other types of computing resources are also within the scope of the present disclosure.

The chaos engineering system 200 may be configured to identify a public key from the certificate chain 300 based on the received indication of the scope of execution. In some example embodiments, in response to receiving the indication of the scope of execution, the chaos engineering system 200 may retrieve the public key from the certificate chain 300 stored in the repository 202 using the received indication of the scope of execution. For example, the chaos engineering system 200 may retrieve a first public key based on the indication of the scope of execution indicating a first software application 212, but the chaos engineering system 200 may retrieve a second public key different from the first public key based on the indication of the scope of execution indicating a second software application 212 (e.g., "APPLICATION N") different from the first software application 212 (e.g., "APPLICATION A"). Similarly, in another example, the chaos engineering system 200 may retrieve a first public key based on the indication of the scope of execution indicating a first software application 212, but the chaos engineering system 200 may retrieve a second public key different from the first public key based on the indication of the scope of execution indicating a cloud environment that encompasses the first software application 212 and other software applications 212. In this way, different public keys may be stored for different scopes of execution for a single tenant 214, and the chaos engineering system 200 may determine which public key to retrieve based on a specific combination of tenant 214 and scope of execution.

The chaos engineering system 200 may transmit the identified public key to the tenant 214. For example, the chaos engineering system 200 may transmit the identified public key to a computer resource associated with the tenant 214 (e.g., to a computing device of a user 230 included as an authorized user of the tenant 214). The public key may then be used by the tenant 214 to encrypt the chaos experiment, thereby forming an encrypted version of the chaos experiment.

In some example embodiments, the chaos engineering system 200 may receive the encrypted version of the chaos experiment from the tenant 214 (e.g., from a computing device of the user 230 included as an authorized user of the tenant 214). For example, the chaos engineering component 204 of the chaos engineering system 200 may receive the encrypted version of the chaos experiment as part of or otherwise in association with a request from the tenant 214 to schedule or trigger execution of the chaos experiment. If the encrypted version of the chaos experiment is received in association with a request from the tenant 214 to schedule an execution of the chaos experiment, then the chaos engineering component 204 may store the encrypted version of the chaos experiment in an experiment store 206 for subsequent retrieval and transmission in accordance with the schedule indicated by the tenant in the request.

The chaos experiment may comprise code that is configured to, when executed, induce a turbulent condition in one or more computing resources of the multitenancy environment 210. The turbulent condition may comprise a failure of the computing resource(s), a latency in the computing resource(s), or a resource exhaustion attack. A failure of the computing resource(s) may be induced by causing a crash of a software component or a hardware component. A latency in the computing resource(s) may be induced by simulating packet delay or limiting the bandwidth usage of the computing resource(s). A resource exhaustion attack may be induced by flooding a computing resource with superfluous requests to overload computing resource and prevent some or all legitimate requests from being fulfilled. Other types of turbulent conditions are also within the scope of the present disclosure.

In some example embodiments, the chaos experiment may comprise a human-readable data-serialization language file. Examples of a human-readable data-serialization language include, but are not limited to, YAML Ain't Markup Language (YAML) and JavaScript® Object Notation (JSON). Other human-readable data-serialization languages and other format for the chaos experiment are also within the scope of the present disclosure.

In some example embodiments, software agents 218 of the chaos engineering system 200 may be running in the applications 214 of the multitenancy environment 210 or in other computing resources of the multitenancy environment 210. For example, a first software agent 218-1 may be running in a first application 212-1, a second software agent 218-2 may be running in a second application 212-2, and so on and so forth. The chaos engineering system 200 may transmit the encrypted version of the chaos experiment to one or more software agents 218 running in the multitenancy environment 210. In some example embodiments, the chaos engineering component 204 may retrieve the encrypted version of the chaos experiment and transmit it to a plurality of software agents 218, with each one of the plurality of software agents 218 running in a different application 212 or computing resource.

The chaos engineering system 200 may also transmit a private key to the software agent(s) 218. The private key and the public key may form an asymmetric key encryption pair, and the private key may be being configured to be used to decrypt messages encrypted using the public key, such as the encrypted version of the chaos experiment. The chaos engineering system 200 may transmit the private key to the software agent(s) 218 prior to the receiving of the indication of the scope of execution for the chaos experiment from the tenant 214. For example, prior to receiving the indication of the scope of execution for the chaos experiment from the tenant, the chaos engineering system 200 may communicate with the computing resources of the multitenancy environment 210 to build up the certificate chains 300 and transmit the private keys corresponding to the certificate chains 300 to the software agents 218 running on the computing resources of the multitenancy environment 210. Alternatively, the chaos engineering system 200 may transmit the private key to the software agent(s) 218 in response to or otherwise based on receiving the indication of the scope of execution for the chaos experiment from the tenant 214. Each software agent 218 may have a corresponding key store 216 in which the software agent 218 stores the private key it receives from the chaos engineering system 200. For example, in FIG. 2, software agents 218-1 to 218-N store private keys in their corresponding key stores 216-1 to 216-N. Each key store 216 may store the private key in association with the tenant 214 to which it corresponds.

Each software agent 218 may be configured to execute chaos experiments against a scoped environment. For example, upon receiving an encrypted chaos experiment, the software agent 218 may attempt to decrypt the encrypted chaos experiment with its available private keys. If the software agent 218 is able to decrypt the encrypted chaos experiment, then the software agent 218 knows which tenant 214 is the scope for execution of the experiment. Furthermore, the software agent 218 may consult the validity of the certificate for the private key by contacting the repository 202. The software agent 218 is only able to execute a particular chaos experiment if it holds the private key for decrypting the encrypted version of that chaos experiment.

In some example embodiments, the chaos engineering system 200 may send out the encrypted version of the chaos experiment to only the software agents 218 of the indicated scope of execution. This initial filtering on the transmission of the encrypted version of the chaos experiment acts as a first layer of ensuring that chaos experiments are not run in incorrect environments. When an execution is triggered by the chaos engineering system 200, the software agents 218 that received the encrypted version of the chaos experiment may try to decrypt the encrypted version of the chaos experiment with the private keys that they have stored in their key store 216. If the key store 216 does not hold the corresponding private key, then the chaos experiment is not executed by the software agent 218, thereby providing an additional improved layer of security to ensure that the chaos experiment is only executed where it should be executed in accordance with the indicated scope of execution. Also, it ensures that software agents 218 that do not possess the private key are unable to identify to which tenant 214 the chaos experiment belongs, as well as the details of the chaos experiment (e.g., the turbulent condition to be induced by the chaos experiment).

If the software agent 218 finds the private key for the chaos experiment, it may execute the chaos experiment in accordance with the particular scope corresponding to the private key, but only on functionality or infrastructure for that particular tenant 214. For example, if the scope of execution is application-based and the chaos experiment is configured to inject particular error codes to request responses, this chaos experiment may only be executed for requests of that particular tenant 214. In this way, the blast radius of the chaos experiment is tenant-based, not based on the cloud provider 220.

Certain chaos experiments that are encrypted with a general public key that corresponds to an intermediate certificate (e.g., scoped for a complete cloud infrastructure or a group of applications) are executed automatically for multiple applications or infrastructure components of the appropriate tenant 214. All of the software agents 218 that belong to that scope (e.g., 20 chaos agents for 20 different applications) may have the corresponding private key for the intermediate certificate and, therefore, may be able to decrypt and execute the chaos experiments. Other chaos experiments may be very narrowly-scoped (e.g., scoped for a particular function of an application), and only one specific software agent 218 may have the corresponding private key to decrypt and execute the chaos experiment.

More narrowly-scoped certificates of a tenant 214 may be located after intermediate certificates of the tenant 214 that are in turn located after the root certificate of the tenant 214 in the certificate chains 300 in the repository 202. In this way, the user 230 included as an authorized user of the tenant 214 may disable chaos experiments in different scopes by revoking the corresponding certificate in the certificate chain 300. This approach may be used, for example, to disable all chaos experiments in a particular region during normal day-time working hours (e.g., where end users would use the system) and enable them again during night-time, thereby giving the user 230 a dynamic way of managing chaos experiments on different scopes of granularity and providing auditability of permissions by tracking the revocation and creation of certificates.

In some example embodiments, in response to or otherwise based on receiving the encrypted version of the chaos experiment from the chaos engineering system 200, the software agent 218 may attempt to decrypt the encrypted version of the chaos experiment using a private key from its corresponding key store 216. For example, the software agent 218 may search through its key store 216 to find a private key that is capable of decrypting the encrypted version of the chaos experiment. When a private key is able to decrypt the encrypted version of the chaos experiment, the software agent 218 may identify the tenant 214 corresponding to that private key as the tenant 214 on which to execute the chaos experiment. The software agent 218 may execute the decrypted chaos experiment within the scope of execution on one or more computing resources of the tenant 214 in response to the decrypting of the encrypted version of the chaos experiment using the private key of the tenant 214. In contrast, the software agent 218 may prevent execution of the chaos experiment on computing resources of other tenants 214 whose corresponding private keys were not capable of decrypting the encrypted version of the chaos experiment.

Figure 4:
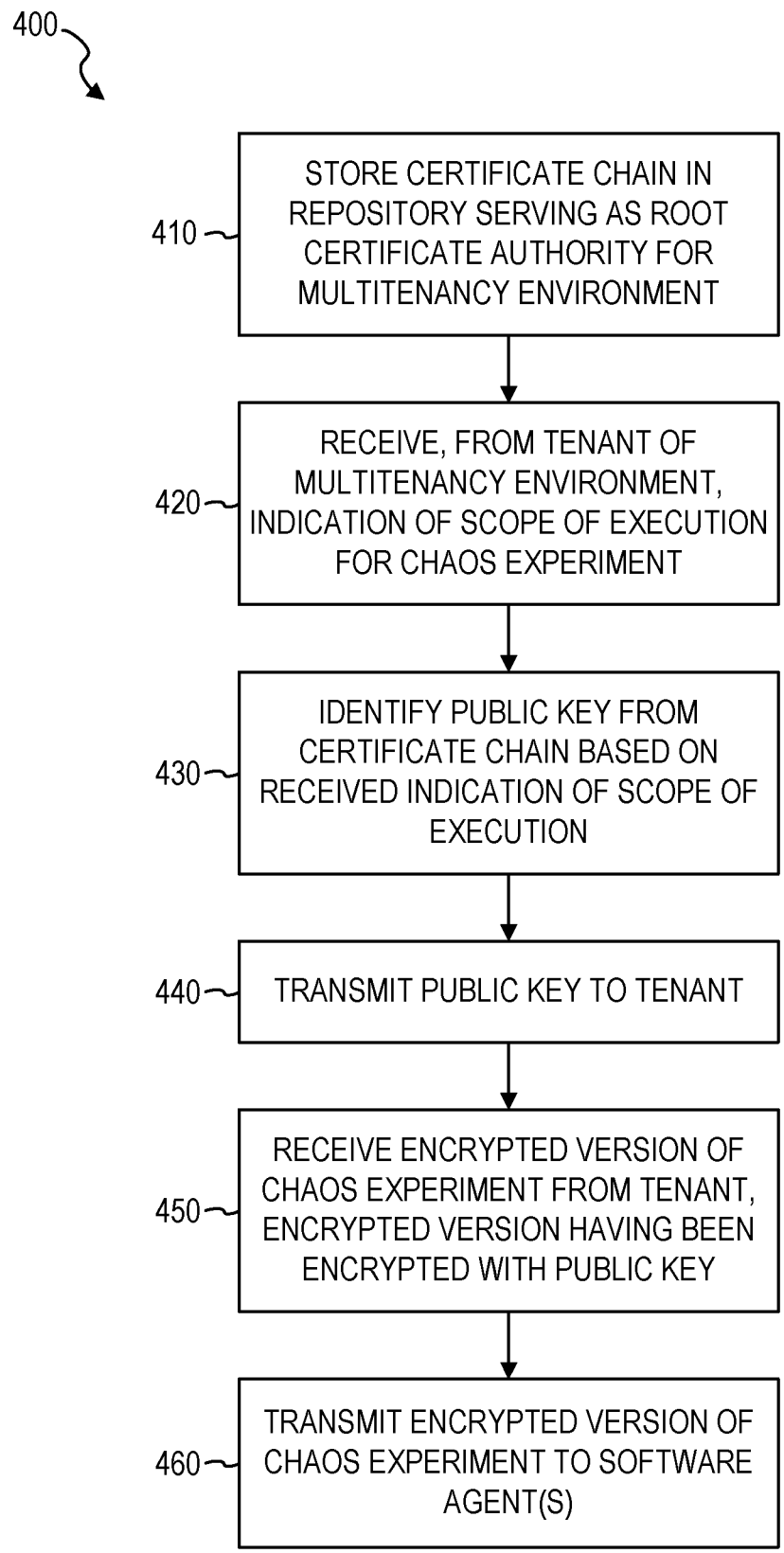
FIG. 4 is a flowchart illustrating an example method of implementing secure tenant-based chaos experiments using certificates.

FIG. 4 is a flowchart illustrating an example method 400 of implementing secure tenant-based chaos experiments using certificates. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the chaos engineering system 200 of FIG. 2 or any combination of one or more of its components (e.g., the repository 202, the chaos engineering component 204).

At operation 410, the chaos engineering system 200 may store one or more certificate chains 300 in the repository 202. The repository 202 may serve as a root certificate authority for the multitenancy environment 210. In some example embodiments, each certificate chain 300 is stored in association with a corresponding tenant 214, thereby enabling data to be accessed and retrieved from the appropriate certificate chain when data is requested in association with a particular tenant 214.

The chaos engineering system 200 may, at operation 420, receive an indication of a scope of execution for a chaos experiment from a tenant 214 of the multitenancy environment 210. For example, a user 230 that is included as an authorized user of the tenant 214 may use a computing device to submit a request to the chaos engineering system 200. The request may comprise a request to schedule or trigger the chaos experiment and include the indication of the scope of execution, or the request may comprise a request for a public key and include the indication of the scope of execution. The indication of the scope of execution may indicate a computing resource of the multitenancy environment 210 within which the chaos experiment is to be executed. The computing resource may comprise a service of a microservice architecture, an application, a module of the application, a cloud environment, or a computing infrastructure. Other types of computing resources are also within the scope of the present disclosure.

Next, the chaos engineering system 200 may identify a public key from a certificate chain based on the received indication of the scope of execution, at operation 430. The identifying of the public key may comprise retrieving the public key from the certificate chain 300 stored in the repository 202 using the received indication of the scope of execution. For example, the chaos engineering system 200 may retrieve a first public key based on the indication of the scope of execution indicating a first software application 212, but the chaos engineering system 200 may retrieve a second public key different from the first public key based on the indication of the scope of execution indicating a second software application 212 (e.g., "APPLICATION N") different from the first software application 212 (e.g., "APPLICATION A"). Similarly, the chaos engineering system 200 may retrieve a first public key based on the indication of the scope of execution indicating a first software application 212, but the chaos engineering system 200 may retrieve a second public key different from the first public key based on the indication of the scope of execution indicating a cloud environment that encompasses the first software application 212 and other software applications 212. In this way, different public keys may be stored for different scopes of execution for a single tenant 214, and the chaos engineering system 200 may determine which public key to retrieve based on a specific combination of tenant 214 and scope of execution.

Then, at operation 440, the chaos engineering system 200 may transmit the identified public key to the tenant 214. For example, the chaos engineering system 200 may transmit the identified public key to a computer resource associated with the tenant 214 (e.g., to a computing device of a user 230 included as an authorized user of the tenant 214). The public key may then be used by the tenant 214 to encrypt the chaos experiment, thereby forming an encrypted version of the chaos experiment.

The chaos engineering system 200 may also transmit a private key to the one or more software agents 218. The private key and the public key may form an asymmetric key encryption pair, and the private key may be configured to be used to decrypt messages encrypted using the public key. The chaos engineering system 200 may transmit the private key to the software agent(s) 218 prior to the receiving of the indication of the scope of execution for the chaos experiment from the tenant 214. For example, prior to receiving the indication of the scope of execution for the chaos experiment from the tenant, the chaos engineering system 200 may communicate with the computing resources of the multitenancy environment 210 to build up the certificate chains 300 and transmit the private keys corresponding to the certificate chains 300 to the software agents 218 running on the computing resources of the multitenancy environment 210. Alternatively, the chaos engineering system 200 may transmit the private key to the software agent(s) 218 in response to or otherwise based on receiving the indication of the scope of execution for the chaos experiment from the tenant 214.

At operation 450, the chaos engineering system 200 may receive an encrypted version of the chaos experiment from the tenant 214. The encrypted version of the chaos experiment may have been encrypted with the identified public key. In some example embodiments, the chaos experiment may be configured to induce a turbulent condition in one or more computing resources of the multitenancy environment. The turbulent condition may comprise a failure of the one or more computing resources, a latency in the one or more computing resources, or a resource exhaustion attack. Other types of turbulent conditions are also within the scope of the present disclosure. In some example embodiments, the chaos experiment may comprise a human-readable data-serialization language file. However, other formats may also be used for the chaos experiment.

Next, the chaos engineering system 200 may transmit the encrypted version of the chaos experiment to one or more software agents 218, at operation 460. The transmitting of the encrypted version of the chaos experiment to the one or more software agents 218 may comprise transmitting the encrypted version of the chaos experiment to a plurality of software agents 218, with each one of the plurality of software agents 218 running in a different application 212 or a different cloud environment.

It is contemplated that any of the other features described within the present disclosure can be incorporated into the method 400.

Figure 5:
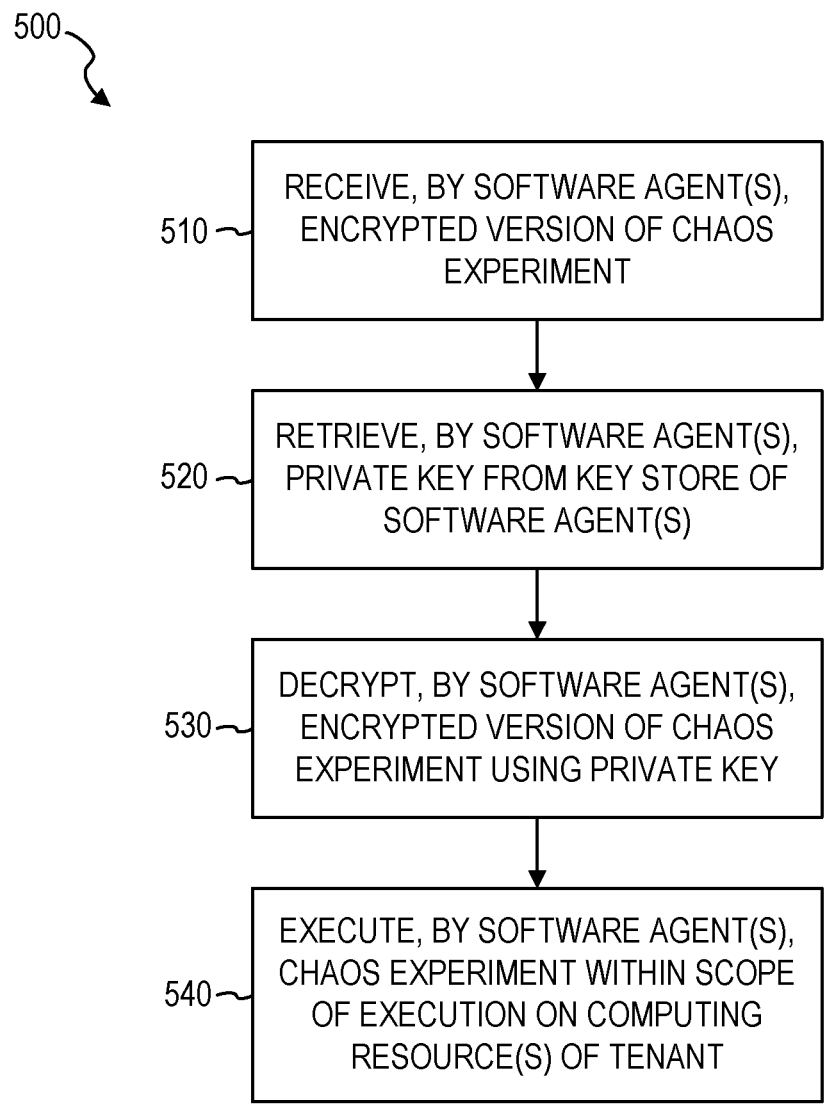
FIG. 5 is a flowchart illustrating another example method of implementing secure tenant-based chaos experiments using certificates.

FIG. 5 is a flowchart illustrating another example method 500 of implementing secure tenant-based chaos experiments using certificates. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by one of the software agents 218 of FIG. 2. The method 500 may include operations 510, 520, 530, and 540 being performed subsequent to operation 460 of the method 400.

At operation 510, the software agent 218 may receive the encrypted version of the chaos experiment. The encrypted version of the chaos experiment may have been transmitted to the software agent 218 by the chaos engineering system 200 via a network connection.

Next, at operation 520, the software agent 218 may retrieve a private key from the key store 216 of the software agent 218. The private key may be stored in the key store 216 in association with the tenant 214.

Then, the software agent 218 may decrypt the encrypted version of the chaos experiment using the private key, at operation 530. As a result of the decrypting of the encrypted version of the chaos experiment, the chaos experiment may be executed. This reliance on the correct private key that corresponds to the public key that was used to encrypt the chaos experiment in order to decrypt the encrypted version of the chaos experiment ensures that the chaos experiment will not be executed on an incorrect tenant 214, since the correct private key would not be stored in association with an incorrect tenant 214.

At operation 540, the software agent 218 may execute the chaos experiment within the scope of execution on one or more computing resources of the tenant 214 in response to the decrypting of the encrypted version of the chaos experiment using the private key. Executing the chaos experiment may comprise inducing the turbulent condition in the computing resource(s) of the multitenancy environment 210. In some example embodiments, the software agent 218 may prevent execution of the chaos experiment on computing resources of another tenant 214 of the multitenancy environment 210 based on the decrypting of the encrypted version of the chaos experiment using the private key.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving, from a tenant of a multitenancy environment, an indication of a scope of execution for a chaos experiment; identifying a public key from a certificate chain based on the received indication of the scope of execution; transmitting the identified public key to the tenant; receiving an encrypted version of the chaos experiment from the tenant, the encrypted version of the chaos experiment having been encrypted with the identified public key; and transmitting the encrypted version of the chaos experiment to one or more software agents.

Example 2 includes the computer-implemented method of example 1, wherein the indication of the scope of execution indicates a computing resource of the multitenancy environment within which the chaos experiment is to be executed, the computing resource comprising a service of a microservice architecture, an application, a module of the application, a cloud environment, or a computing infrastructure.

Example 3 includes the computer-implemented method of example 1 or example 2, wherein the chaos experiment is configured to induce a turbulent condition in one or more computing resources of the multitenancy environment, the turbulent condition comprising a failure of the one or more computing resources, a latency in the one or more computing resources, or a resource exhaustion attack.

Example 4 includes the computer-implemented method of any one of examples 1 to 3, wherein the chaos experiment comprises a human-readable data-serialization language file.

Example 5 includes the computer-implemented method of any one of examples 1 to 4, further comprising: storing the certificate chain in a repository, the repository serving as a root certificate authority for the multitenancy environment, the identifying the public key comprising retrieving the public key from the certificate chain stored in the repository using the received indication of the scope of execution.

Example 6 includes the computer-implemented method of any one of examples 1 to 5, further comprising: transmitting a private key to the one or more software agents, the private key and the public key forming an asymmetric key encryption pair, and the private key being configured to be used to decrypt messages encrypted using the public key.

Example 7 includes the computer-implemented method of any one of examples 1 to 6, wherein the transmitting the encrypted version of the chaos experiment to the one or more software agents comprises transmitting the encrypted version of the chaos experiment to a plurality of software agents, each one of the plurality of software agents running in a different cloud environment.

Example 8 includes the computer-implemented method of any one of examples 1 to 7, further comprising: receiving, by one of the one or more software agents, the encrypted version of the chaos experiment; retrieving, by the one of the one or more software agents, a private key from a key store of the one of the one or more software agents, the private key being stored in the key store in association with the tenant; decrypting, by the one of the one or more software agents, the encrypted version of the chaos experiment using the private key; and executing, by the one of the one or more software agents, the chaos experiment within the scope of execution on one or more computing resources of the tenant in response to the decrypting of the encrypted version of the chaos experiment using the private key.

Example 9 includes the computer-implemented method of any one of examples 1 to 8, further comprising: preventing, by the one of the one or more software agents, execution of the chaos experiment on computing resources of another tenant of the multitenancy environment based on the decrypting of the encrypted version of the chaos experiment using the private key.

Example 10 includes a system comprising: at least one processor; and a non-transitory computer-readable medium storing executable instructions that, when executed, cause the at least one processor to perform the method of any one of examples 1 to 9.

Example 11 includes a non-transitory machine-readable storage medium, tangibly embodying a set of instructions that, when executed by at least one processor, causes the at least one processor to perform the method of any one of examples 1 to 9.

Example 12 includes a machine-readable medium carrying a set of instructions that, when executed by at least one processor, causes the at least one processor to carry out the method of any one of examples 1 to 9.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
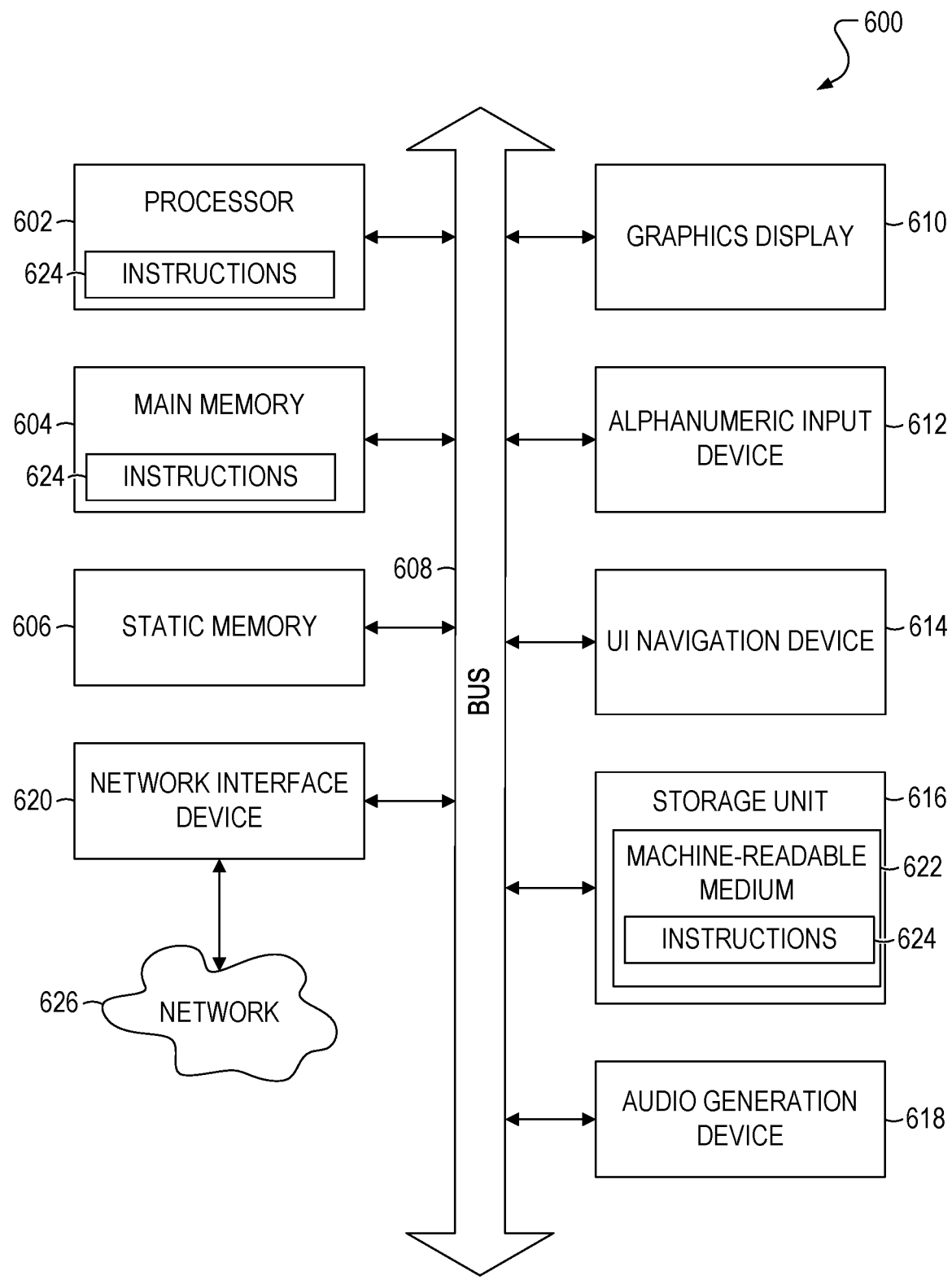
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
   receiving, from a tenant of a multitenancy environment, an indication of a scope of execution for a chaos experiment;
   identifying a public key from a certificate chain based on the received indication of the scope of execution;
   transmitting the identified public key to the tenant;
   receiving an encrypted version of the chaos experiment from the tenant, the encrypted version of the chaos experiment having been encrypted with the identified public key; and
   transmitting the encrypted version of the chaos experiment to one or more software agents.

2. The computer-implemented method of claim 1, wherein the indication of the scope of execution indicates a computing resource of the multitenancy environment within which the chaos experiment is to be executed, the computing resource comprising a service of a microservice architecture, an application, a module of the application, a cloud environment, or a computing infrastructure.

3. The computer-implemented method of claim 1, wherein the chaos experiment is configured to induce a turbulent condition in one or more computing resources of the multitenancy environment, the turbulent condition comprising a failure of the one or more computing resources, a latency in the one or more computing resources, or a resource exhaustion attack.

4. The computer-implemented method of claim 1, wherein the chaos experiment comprises a human-readable data-serialization language file.

5. The computer-implemented method of claim 1, further comprising:
   storing the certificate chain in a repository, the repository serving as a root certificate authority for the multitenancy environment, the identifying the public key comprising retrieving the public key from the certificate chain stored in the repository using the received indication of the scope of execution.

6. The computer-implemented method of claim 1, further comprising:
   transmitting a private key to the one or more software agents, the private key and the public key forming an asymmetric key encryption pair, and the private key being configured to be used to decrypt messages encrypted using the public key.

7. The computer-implemented method of claim 1, wherein the transmitting the encrypted version of the chaos experiment to the one or more software agents comprises transmitting the encrypted version of the chaos experiment to a plurality of software agents, each one of the plurality of software agents running in a different cloud environment.

8. The computer-implemented method of claim 1, further comprising:
   receiving, by one of the one or more software agents, the encrypted version of the chaos experiment;
   retrieving, by the one of the one or more software agents, a private key from a key store of the one of the one or more software agents, the private key being stored in the key store in association with the tenant;
   decrypting, by the one of the one or more software agents, the encrypted version of the chaos experiment using the private key; and
   executing, by the one of the one or more software agents, the chaos experiment within the scope of execution on one or more computing resources of the tenant in response to the decrypting of the encrypted version of the chaos experiment using the private key.

9. The computer-implemented method of claim 8, further comprising:
   preventing, by the one of the one or more software agents, execution of the chaos experiment on computing resources of another tenant of the multitenancy environment based on the decrypting of the encrypted version of the chaos experiment using the private key.

10. A system of comprising:
    at least one hardware processor; and
    a non-transitory computer-readable medium storing executable instructions that, when executed, cause the at least one hardware processor to perform computer operations comprising:

receiving, from a tenant of a multitenancy environment, an indication of a scope of execution for a chaos experiment;

identifying a public key from a certificate chain based on the received indication of the scope of execution;

transmitting the identified public key to the tenant;

receiving an encrypted version of the chaos experiment from the tenant, the encrypted version of the chaos experiment having been encrypted with the identified public key; and transmitting the encrypted version of the chaos experiment to one or more software agents.

11. The system of claim 10, wherein the indication of the scope of execution indicates a computing resource of the multitenancy environment within which the chaos experiment is to be executed, the computing resource comprising a service of a microservice architecture, an application, a module of the application, a cloud environment, or a computing infrastructure.

12. The system of claim 10, wherein the chaos experiment is configured to induce a turbulent condition in one or more computing resources of the multitenancy environment, the turbulent condition comprising a failure of the one or more computing resources, a latency in the one or more computing resources, or a resource exhaustion attack.

13. The system of claim 10, wherein the chaos experiment comprises a human-readable data-serialization language file.

14. The system of claim 10, wherein the operations further comprise:

storing the certificate chain in a repository, the repository serving as a root certificate authority for the multitenancy environment, the identifying the public key comprising retrieving the public key from the certificate chain stored in the repository using the received indication of the scope of execution.

15. The system of claim 10, wherein the operations further comprise:

transmitting a private key to the one or more software agents, the private key and the public key forming an asymmetric key encryption pair, and the private key being configured to be used to decrypt messages encrypted using the public key.

16. The system of claim 10, wherein the transmitting the encrypted version of the chaos experiment to the one or more software agents comprises transmitting the encrypted version of the chaos experiment to a plurality of software agents, each one of the plurality of software agents running in a different cloud environment.

17. The system of claim 10, wherein the operations further comprise:

receiving, by one of the one or more software agents, the encrypted version of the chaos experiment;

retrieving, by the one of the one or more software agents, a private key from a key store of the one of the one or more software agents, the private key being stored in the key store in association with the tenant;

decrypting, by the one of the one or more software agents, the encrypted version of the chaos experiment using the private key; and executing, by the one of the one or more software agents, the chaos experiment within the scope of execution on one or more computing resources of the tenant in response to the decrypting of the encrypted version of the chaos experiment using the private key.

18. The system of claim 17, further comprising:

preventing, by the one of the one or more software agents, execution of the chaos experiment on computing resources of another tenant of the multitenancy environment based on the decrypting of the encrypted version of the chaos experiment using the private key.

19. A non-transitory machine-readable storage medium tangibly embodying a set of instructions that, when executed by at least one hardware processor, causes the at least one hardware processor to perform computer operations comprising:

receiving, from a tenant of a multitenancy environment, an indication of a scope of execution for a chaos experiment;

identifying a public key from a certificate chain based on the received indication of the scope of execution;

transmitting the identified public key to the tenant;

receiving an encrypted version of the chaos experiment from the tenant, the encrypted version of the chaos experiment having been encrypted with the identified public key; and transmitting the encrypted version of the chaos experiment to one or more software agents.

20. The non-transitory machine-readable storage medium of claim 19, wherein the indication of the scope of execution indicates a computing resource of the multitenancy environment within which the chaos experiment is to be executed, the computing resource comprising a service of a microservice architecture, an application, a module of the application, a cloud environment, or a computing infrastructure.

* * * * *